US006908667B2

(12) United States Patent
Christ et al.

(10) Patent No.: US 6,908,667 B2
(45) Date of Patent: Jun. 21, 2005

(54) FIBER-REINFORCED MATERIAL COMPOSED, AT LEAST IN A SURFACE REGION, OF A METAL/CERAMIC COMPOSITE, MOLDING COMPOSED OF THE FIBER-REINFORCED MATERIAL AND METHOD OF PRODUCING THE FIBER-REINFORCED MATERIAL

(75) Inventors: Martin Christ, Wehringen (DE); Michael Heine, Allmannshofen (DE); Andreas Kienzle, Thierhaupten (DE); Rainer Zimmermann-Chopin, Ellgau (DE)

(73) Assignee: SGL Carbon AG, Wiesbaden (DE)

( * ) Notice: Subject to any disclaimer, the term of this patent is extended or adjusted under 35 U.S.C. 154(b) by 133 days.

(21) Appl. No.: 10/179,481

(22) Filed: Jun. 25, 2002

(65) Prior Publication Data

US 2003/0004050 A1 Jan. 2, 2003

(30) Foreign Application Priority Data

Jun. 30, 2001 (DE) ......................................... 101 31 758

(51) Int. Cl.$^7$ ................................................ D04H 1/00
(52) U.S. Cl. .................... 428/292.1; 428/698; 428/409; 428/66.2; 428/384; 428/367; 428/131; 428/325; 260/998.13; 188/205 R; 501/95.1; 501/99; 501/90; 501/88
(58) Field of Search .......................... 188/205 R, 251 A; 428/698, 384, 409, 66.2, 367, 131, 325, 704, 172, 372, 370, 368, 375, 388, 392, 113, 697; 260/988.13; 501/88, 90, 95.1

(56) References Cited

U.S. PATENT DOCUMENTS 4,778,722 A * 10/1988 Yamamura et al. ......... 428/367

| | | | | |
|---|---|---|---|---|
| 5,151,390 A | * | 9/1992 | Aoki et al. ................. | 501/95.1 |
| 5,688,577 A | * | 11/1997 | Smith et al. ................. | 428/113 |
| 6,030,913 A | | 2/2000 | Heine et al. | |
| 6,231,791 B1 | | 5/2001 | Heine et al. | |
| 6,261,981 B1 | | 7/2001 | Dietrich et al. | |
| 6,716,376 B1 | * | 4/2004 | Haug et al. ................. | 264/29.1 |

FOREIGN PATENT DOCUMENTS

| | | |
|---|---|---|
| DE | 43 22 113 A1 | 12/1994 |
| DE | 197 10 105 | 9/1998 |
| DE | 197 11 829 | 9/1998 |
| DE | 198 56 721 | 6/2000 |
| EP | 0 612 930 A1 | 8/1994 |
| EP | 1 084 997 A2 | 3/2001 |
| GB | 2 249 558 A | 5/1992 |
| JP | 59 137 339 A | 8/1984 |

* cited by examiner

*Primary Examiner*—Merrick Dixon
(74) *Attorney, Agent, or Firm*—Laurence A. Greenberg; Werner H. Stemer; Ralph E. Locher

(57) ABSTRACT

A method is provided for producing a fiber-reinforced material which is composed, at least in a region of a surface layer, of a ceramic composite and has carbon-containing fibers reaction-bonded to a matrix containing the elements Si and C. In particular a method of producing fiber-reinforced silicon carbide is provided in which a structure of a matrix contains cracks and/or pores, at least at ambient temperature, because of a high thermal expansion coefficient compared with that of the fibers. Metals are selectively electrodeposited in the open pores and cracks of the matrix and, in particular, in a region of the electrically conductive reinforcing fibers. As a result, the open pores and cracks are filled and, in addition, metallic top layers are optionally formed that are firmly keyed to the ceramic composite and that may serve as an interlayer for glass top layers or ceramic top layers. A fiber-reinforced composite material, as well as moldings, in particular brake discs, brake linings or clutch plates, composed of such a composite material, are also provided.

17 Claims, 2 Drawing Sheets

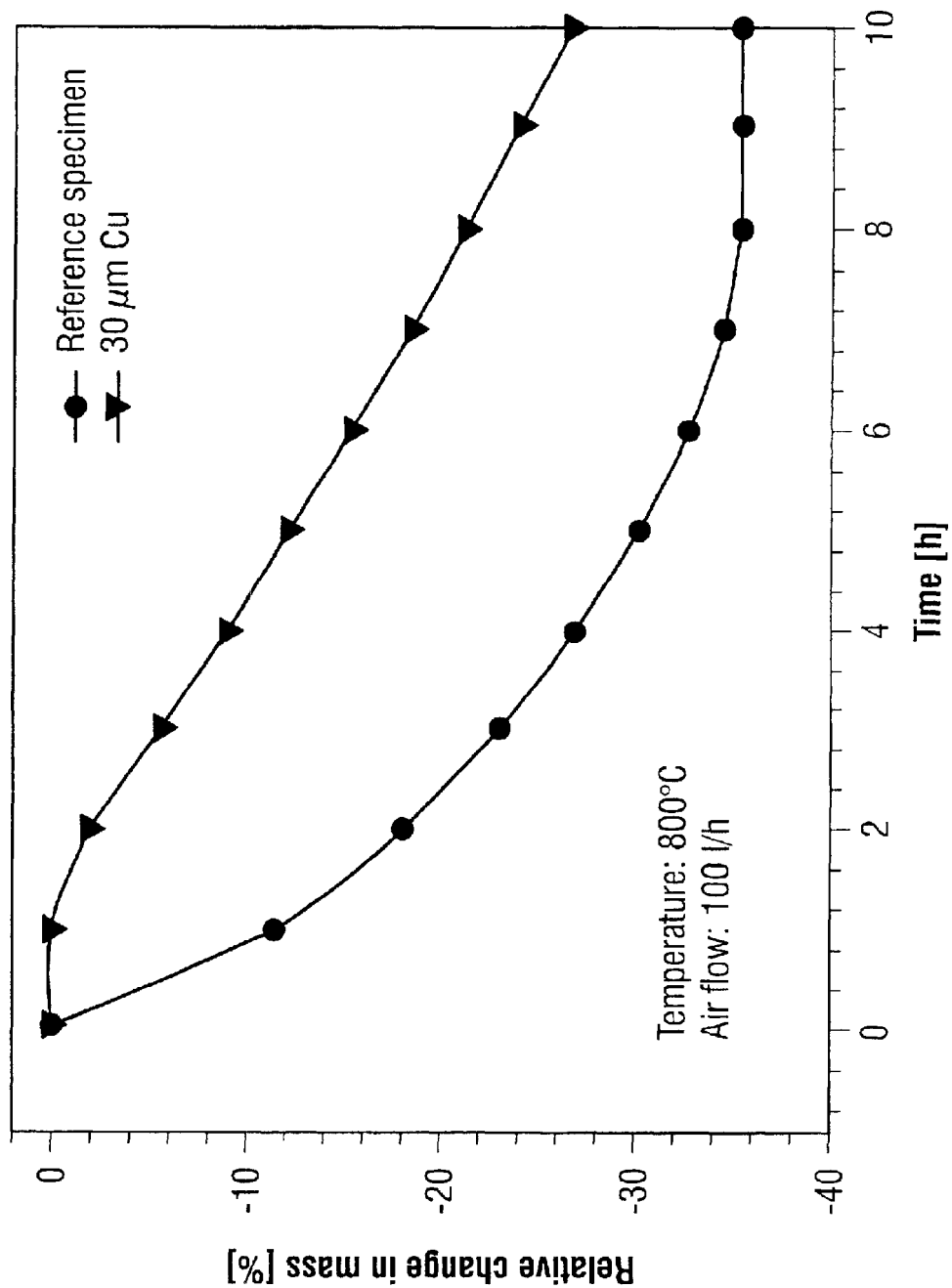

FIBER-REINFORCED MATERIAL COMPOSED, AT LEAST IN A SURFACE REGION, OF A METAL/CERAMIC COMPOSITE, MOLDING COMPOSED OF THE FIBER-REINFORCED MATERIAL AND METHOD OF PRODUCING THE FIBER-REINFORCED MATERIAL

BACKGROUND OF THE INVENTION

Field of the Invention

The invention relates to a fiber-reinforced or fiber bundle-reinforced composite material that is composed, at least in a surface region, of a metal/ceramic composite and has a matrix which includes, at least in a surface layer, at least 25 wt % SiC and further phases of Si and/or Si alloy and/or C. The invention also relates to a method of producing such a composite material as well as to moldings, in particular brake discs, brake linings or clutch plates, composed of such composite material.

The term fiber is to be understood below and in the claims as meaning both individual fibers and fiber bundles that may be bound by polymers or their pyrolysis products.

Generic methods of producing a fiber-reinforced ceramic composite are disclosed, for example, in German Published, Non-Prosecuted Patent Application DE 198 56 721 A1, German Patent DE 197 11 829 C1, corresponding to U.S. Pat. No. 6,261,981, or German Published, Non-Prosecuted Patent Application DE 197 10 105 A1, corresponding to U.S. Pat. Nos. 6,030,913 and 6,231,791, and include, inter alia, the following steps:

a) production of a mixture of carbon-containing fibers, that may be covered with a coating, on one hand, and fillers and/or binders such as, for example, resin and/or pitch, on the other hand, b) shaping of the mixture under pressure and/or temperature and pyrolysis or graphitization to produce a molding, in particular a molding formed of carbon-fiber-reinforced carbon (CFC), and c) infiltration, at least of a surface layer, of the molding with a silicon melt and partial reaction of the carbon of the molding to form SiC for the purpose of producing a molding that is composed, at least in the surface layer, of a ceramic composite formed of carbon-containing fibers embedded in a matrix composed of SiC, Si and C (C/SiC).

The conventional production methods also include those in which the matrix of step c) is produced by a gas-phase infiltration (CVD or CVI) or by the pyrolysis of Si-containing preceramic polymers. As a result, the molding is composed of a ceramic composite having carbon-containing fibers embedded in a matrix composed of SiC, Si and C (C/SiC).

The SiC content of the matrix of the ceramic composite is normally above 25%, preferably above 50%. Depending on the depth of the infiltration with the matrix-forming compounds, the ceramic composite may be restricted to a surface layer or even extend through the entire molding. The proportion by weight of the matrix or its composition may at the same time vary inside the molding, in particular in the depth. The proportion by weight of the matrix at the surface is preferably higher than in the interior of the molding, sometimes even almost 100%.

At the same time, the thermal expansion coefficient of the matrix is, as a rule, higher than that of the fibers. The liquid siliconization, gas-phase infiltration or polymer pyrolysis described for the molding composed of carbon-fiber-reinforced carbon (CFC material) takes place at high temperatures. In that process, after cooling to room temperature, open pores and cracks that extend far down into the depth of the ceramic composite are formed because of the different thermal expansion coefficients of fibers and matrix in the material and, in particular, in the immediate vicinity of the fibers.

That effect occurs, in particular, if the SiC-containing surface layer has a higher proportion by weight of the matrix than the interior of the material.

Those open cracks and pores form paths for penetrating oxygen, with the result that, in particular, the carbon fibers bound in the matrix or the bound carbon are exposed to oxidation. Material applications in the high-temperature range, such as those which are usual for such materials, intensify the oxidative attack further.

SUMMARY OF THE INVENTION

It is accordingly an object of the invention to provide a fiber-reinforced material composed, at least in a surface region, of a metal/ceramic composite, a molding composed of the fiber-reinforced material and a method of producing the fiber-reinforced material, which overcome the hereinafore-mentioned disadvantages of the heretofore-known products and methods of this general type, in which an oxidative attack on the materials is at least reduced and in which the production of the material takes place in such a way that the method does not cause substantially greater expenditure in the form of costs and time as compared with the existing production.

With the foregoing and other objects in view there is provided, in accordance with the invention, a fiber-reinforced composite material, comprising fibers, a surface layer and a matrix containing, at least in the surface layer, at least 25 wt % SiC and further phases of Si, Si alloys or C. The matrix has a structure containing open cracks and/or pores. At least one metal is deposited at least in some of the open cracks and/or pores, in particular in the immediate vicinity of the fibers.

With the objects of the invention in view, there is also provided a method of producing a fiber-reinforced material, which comprises providing the material with carbon-containing and/or carbon-coated fibers and forming the material, at least in a surface region, of a ceramic composite having a matrix containing the elements Si and C resulting from production of a fiber-reinforced material in accordance with standard methods of producing a C/SiC composite material. At least one metal is subsequently electrodeposited at least in some of open cracks and/or pores formed in the matrix, preferably in an immediate vicinity of the fibers.

The method disclosed herein makes it possible to fill up with metals the open pores and cracks in the fiber-reinforced ceramic composite that are due to the production method and thereby to prevent the penetration of substances responsible for the oxidation. In this connection, the invention utilizes, in a controlled way, the improved electrical conductivity of the fibers compared with the electrical conductivity of the matrix containing SiC and silicon. This is possible because, during the electroplating method, the deposition of the metal takes place, in particular, on the material having the higher electrical conductivity and therefore, preferably, in the open cracks and pores that are situated in the immediate vicinity of the fibers and fiber bundles. In this way, the oxidation-endangered fibers are surrounded by a metallic corrosion-protection layer that binds penetrating oxygen.

With application of the electroplating method to siliconized ceramic composites, the metallic deposition first of all takes place not at the surface, but initially in the more deeply situated open pores and cracks. As a result thereof, the latter are sealed by the deposited metal, thereby compensating for the specific disadvantages that result from liquid infiltration of silicon. This applies likewise to the type-related ceramic composites having a SiC-containing matrix which was produced by gas-phase infiltration (CVD or CVI) or polymer pyrolysis. In addition, metals deposited in the C/SiC matrix by electroplating are incorporated in microdisperse form. This produces a strong mechanical keying of the two materials and, in particular, the metal deposited in the matrix provides a good bonding possibility for any metallic top layer to be provided in addition. Consequently, the tendency for the metallic top layer to peel off upon exposure to high temperatures also decreases.

In this connection, the thickness of the layer in which the metal is deposited may be less than, greater than or equal to the thickness of the SiC-containing surface layer. Normally, the thickness of the layer in which the metal is deposited is less than 10 mm, preferably less than 5 mm and particularly preferably less than 0.5 mm.

The proposed deposition of metals in ceramic composites by electroplating is also particularly advantageous since it is difficult in any other way to include metals and alloys having melting points above the process temperature of the liquid silicon infiltration into the fiber-reinforced ceramic or to find suitable metals and alloys having a melting point below the process temperature. A substantial advantage as compared with methods in which metals are liquid-infiltrated above their melting point and, generally, under pressure, is that in the process according to the invention, the metal deposition takes place at ambient temperature, at which the cracks are substantially more strongly expanded than at the high temperatures of the metal melts. Advantageously, the open pores and cracks can thereby be filled up and no longer expand as a result of cooling, as they do after liquid infiltration. The shrinkage of the metal to be observed in the latter method due to cooling contraction therefore does not take place.

If, after the method according to the invention, moldings are produced in which the coefficient of friction is relevant, as for example, in the case of brake discs, brake linings or clutch plates then, depending on the nature and amount of the metal included in the structure by electrodeposition and/or depending on the thickness of the metallic top layer, the future coefficient of friction of the surface of the molding can be adjusted in a controlled way. This is particularly true if copper or a copper alloy is deposited in or on the ceramic composite.

Advantageous refinements of the invention are described herein and recited in the subclaims. The invention relates not only to the method, but also to the material obtained therefrom and suitably configured moldings, such as brake discs, brake linings or clutch plates.

The fiber-reinforced ceramic composites include, in particular, the class of C/SiC materials in which carbon-based fibers, in particular carbon fibers or graphite fibers, are bound in a matrix predominantly formed from SiC, Si and C. The procedure for producing C/SiC material by the method according to the invention resides in there first being formed in a known manner a CFC body that is then converted by liquid infiltration with silicon or a silicon alloy into C/SiC, as already described above. The metals of subgroups I to VIII, in particular Ti, Cr, Fe and Ni, are normally used as constituents of the silicon alloy.

Instead of liquid siliconization, gas-phase infiltration with SiC or pyrolysis of Si-containing polymers that decompose to form SiC-containing phases may be performed.

The C/SiC ceramic composites according to the invention may also include fibers that contain even further elements in addition to carbon, such as Si, B, N, O or Ti, for example. Those fibers are resistant to high temperature and have a significantly higher electrical conductivity than the matrix being formed. This is ensured, in particular, by carbon-containing fibers in an SiC or Si/SiC matrix. However, the base material is not restricted to CFC materials. Poorly conducting ceramic fibers, in particular those based on $SiO_2$, $Al_2O_3$, $ZrO_2$ or SiC, that have been coated with carbon or graphite, may likewise also be used as fiber material. Precursor ceramics, such as those produced, for example, by pyrolysis of polymers that contain one or more of the elements Si, B, C, N, P or Ti may also be used to produce the matrix. However, the matrix may also be produced entirely or partly through the use of gas-phase infiltration. Normally, if produced through the use of the gas-phase method, the matrix has a relatively high SiC content, preferably greater than 80% and, particularly preferably, almost 100%.

In accordance with a preferred variant of the method according to the invention, a CFC material is converted by liquid siliconization into C/SiC. In this connection, it is unimportant whether the CFC material is infiltrated entirely or only partly with silicon or silicon alloy and converted to C/SiC. According to the invention, only the surface layer has to have been converted to C/SiC, which may also include almost 100% of the matrix. The invention therefore also extends to CFC bodies in which siliconization has been performed only in the surface region, but the core remains composed of CFC. The thickness of the surface layer converted to C/SiC is at least 0.2 mm, preferably more than 0.5 mm and particularly preferably more than 5 mm.

After the material has cooled from a process temperature of about 1500–1900° C. to room temperature, liquid siliconization of CFC results in a matrix penetrated by open microcracks and pores as a result of the different thermal expansion coefficients of fibers and matrix. The open cracks and pores extend far into the depth of the C/SiC ceramic and form preferentially at the reinforcing fibers. This applies likewise to the methods of gas-phase infiltration or polymer pyrolysis since in this case, again, cooling takes place from a high process temperature to lower temperatures.

According to the invention, the fiber-reinforced ceramic composite, in particular the C/SiC ceramic, is then immersed in an electroplating bath containing a metal salt or a metal-salt mixture and a direct voltage is applied that produces a deposition current. The electrodeposition of the metal starts in the cracks and pores, preferably in the carbon-rich regions and, in particular, at the carbon fibers with good electrical conduction. Relative to the thickness of the ceramic composite, the electrodeposition of the metal initially starts at the open cracks and pores situated at a distance from the surface of the ceramic composite and then continues towards the surface. The deposition of the metal may be terminated after the open cracks and pores have been filled or continued until a continuous metal layer is formed that covers the entire material surface.

Consequently, the metal may penetrate very deeply into the C/SiC material and thereby undergo a strong keying. Since the thermal coefficient of expansion of the metal is greater than that of the ceramic composite, the high temperature of up to 900° C. prevailing under application conditions of the C/SiC material results in a greater thermal expansion of the metal as compared with the ceramic composite. That further reinforces the keying of the deposited metal in the ceramic.

The deposited metal or the deposited metal alloy completely and impermeably fills at least some of the open cracks and pores of the composite material that act as oxidation paths, at least in a certain portion of the cracks and pores.

Metals having high ductility and low chemical affinity for carbon fibers or carbon-containing or carbon-coated fibers as well as for the matrix of the composite material are preferably electrodeposited. These include, for example, the transition metals of the Cr, Mn, Fe, Co, Ni and Cu group. Cu, Zn, Sn, Ni, Pt, Ti, Ag and Au, as well as their alloys, are particularly preferably used.

Furthermore, metals that have an oxygen-binding effect, in particular at use temperatures above 600° C., are preferably selected for protection against oxidative attack. The further penetration of air to the oxidation-sensitive regions of the C/SiC ceramic material, which include, in particular, the carbon-containing reinforcing fibers, is impeded by the absorption of oxygen and the formation of metal oxides. In this connection, those metals are particularly favorable that form, below approximately 1100° C. with an increase in volume, an oxide layer that adheres firmly to the metallic base. The oxide layer then acts as a diffusion barrier layer for oxygen, with the result that the access of oxygen to internal carbon-fiber-containing regions is prevented.

Cu is particularly preferably deposited, with the result that a firmly adhering $CuO/Cu_2O$ layer can form at the surface of the ceramic composite. The type of the metal deposited is chosen, inter alia, as a function of the future use temperature of the ceramic composite. In this connection, the metals Cr, Ni, Co and alloys thereof are preferably used for higher application temperatures of the ceramic composite. According to the invention, a plurality of different metals or alloys may be deposited in turn. The method of producing the metal deposit according to the invention also makes it possible to seal cracks caused by a required application of the ceramic composite according to the invention in a simple way in a repeat deposition step. This makes it possible to increase the service life of the ceramic composite substantially.

In a further advantageous refinement of the invention, the metal layer is reinforced by one or more further top layers composed of glass or ceramic material. In order to improve the corrosion protection further, in this case the first metallic layer should be capable of producing a good adhesion to a non-oxidizing glass layer or ceramic layer situated further up.

In a particularly preferable application of the invention, the method described above is used for the production of brake discs, brake linings or clutch plates. The wear properties and the abrasion of brake discs and brake linings are substantially determined by the material composition of the frictional layer of the brake disc. In this connection, C/SiC brake discs are notable for a low abrasion accompanied by a high coefficient of friction. The high abrasion caused thereby in the case of brake linings is disadvantageous. A marked improvement in the frictional behavior and a lower abrasion of the brake linings can be achieved by the deposition of a metal according to the invention at least in the surface region of the material structure of the brake disc and/or the brake lining. The surface region then forms an integrated frictional layer or an integrated frictional lining in an otherwise unaltered, single-piece component. The method, in particular in the case of thin brake discs, brake linings or clutch plates, can alternatively be carried out by electrodeposition with the formation of a structure substantially or completely over the entire thickness of the ceramic composite. The future coefficient of friction of the components used in the respective tribological system can then be altered in a controlled way, depending on the nature and amount of the deposited metal and/or on the depth of the deposition. In tribological systems, such as brake discs, clutches and brake linings, on one hand, Cu and its alloys are preferably used as a metal for inclusion in the ceramic structure. If, on the other hand, no inclusion of metals is to take place in certain sections, it is sufficient only to mask or seal off only those sections against immersion in the electroplating bath. Preferably, nonconducting lacquers or waxes are used for this purpose.

Other features which are considered as characteristic for the invention are set forth in the appended claims.

Although the invention is illustrated and described herein as embodied in a fiber-reinforced material composed, at least in a surface region, of a metal/ceramic composite, a molding composed of the fiber-reinforced material and a method of producing the fiber-reinforced material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagram in which a relative change in mass of a thin porous C/SiC plate with deposited Cu is shown in comparison with a comparable plate without Cu, as a function of time.

DESCRIPTION OF THE PREFERRED EMBODIMENTS

In order to produce a brake disc with Cu inclusions, a disc was used that was produced by liquid siliconization of a CFC parent body in accordance with the method according to German Published, Non-Prosecuted Patent Application DE 197 10 105 A1, corresponding to U.S. Pat. Nos. 6,030,913 and 6,231,791. The silicized brake disc having an external radius of 350 mm was dried, degreased and transferred to an electroplating bath. The electroplating bath was composed of an aqueous 12.5% Cu(II) sulphate solution. In order to deposit Cu, a direct voltage was applied with a current density of 0.001 to 0.03 A/cm². The deposition of Cu was terminated after approximately 2 hours.

Figure 2:
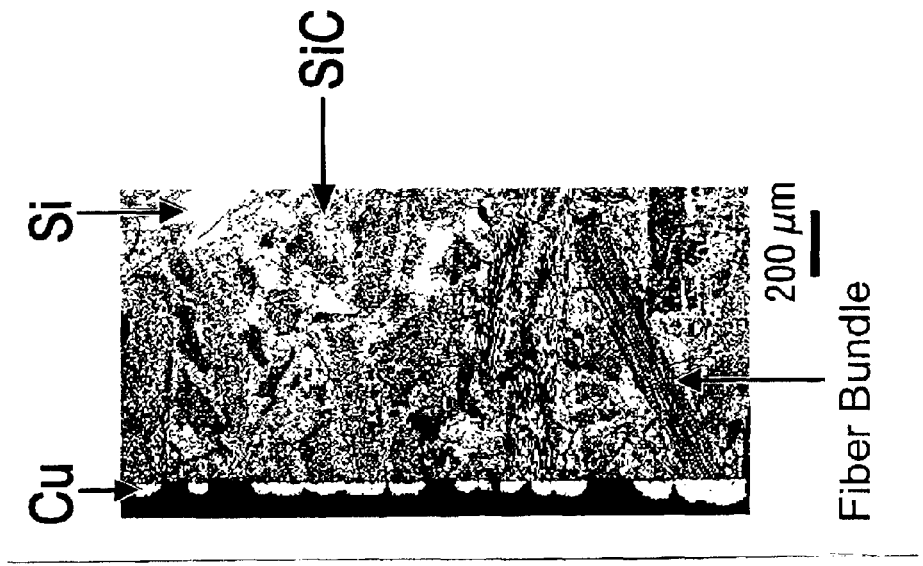
FIG. 2 is a photomicrograph of an enlarged portion of FIG. 1.
Figure 1:
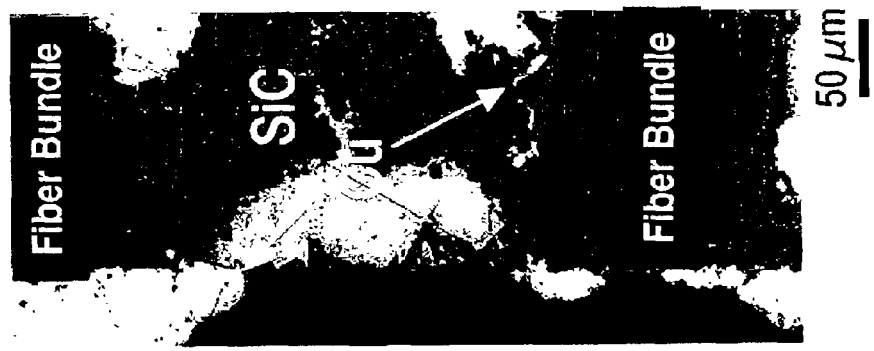
FIG. 1 is a photomicrograph of a surface region of a structure of a brake disc produced by the method according to the invention.

The inclusion of Cu according to the invention in the structure of the ceramic composite of the brake disc can easily be demonstrated by a photomicrograph, such as that shown in FIG. 1. In the latter, the Cu deposited is illustrated by white areas, whereas the matrix of the ceramic composite in which the carbon-containing fibers are bound is formed by Si and SiC fields that are distinguishable by different shades of gray. As can be perceived therein and, in particular, as a result of the enlarged detail in accordance with FIG. 2, Cu was deposited in a distributed way in the entire structure, preferably in cracks and pores in the region of the fibers.

In addition, electrodeposition was performed in the present case in such a way that a top layer of metallic copper having a thickness of approximately 10 μm was additionally formed on the friction surface of the brake disc. The Cu layer deposited on the friction surface was then removed mechanically during the final machining of the disc, in particular by metal-removing methods.

When a thin porous C/SiC plate having a Cu layer with a thickness of 30 μm deposited on all sides by the method according to the invention was disposed in air at 800° C. in a 100 1/hour air flow, it exhibited, after 1 hour, a weight loss of 1–2%, as is evident from FIG. 3. In contrast, a reference specimen without a Cu layer had a 12% weight loss.

We claim:

1. A fiber-reinforced material, comprising:
   a surface region;
   a metal/ceramic composite disposed at least in said surface region and containing reinforcing fibers;
   said reinforcing fibers being selected from the group consisting of carbon fibers and graphite fibers;
   a matrix containing, at least in said surface region, at least 25% by weight of SiC and further phases of Si, Si alloys, or C;
   said matrix having a structure containing at least one of open cracks and pores; and
   at least one metal deposited at least in some of said open cracks and pores.

2. The fiber-reinforced material according to claim 1, wherein said at least one metal is deposited in the immediate vicinity of said fibers.

3. The fiber-reinforced material according to claim 1, wherein said at least one metal is deposited at least in said surface region of said composite material.

4. The fiber-reinforced material according to claim 3, which further comprises a top layer composed of a material selected from the group consisting of said deposited metal and a further metal.

5. The fiber-reinforced material according to claim 1, which further comprises at least one further layer selected from the group consisting of glass and ceramic material disposed on said top layer.

6. The fiber-reinforced material according to claim 4, which further comprises at least one further layer selected from the group consisting of glass and ceramic material disposed on said top layer.

7. The fiber-reinforced material according to claim 1, wherein said surface region has a thickness of at least 0.2 mm.

8. The fiber-reinforced material according to claim 1, wherein said surface region has a thickness of more than 5 mm.

9. The fiber-reinforced material according to claim 1, wherein all of said matrix contains at least 25 wt % SiC and further phases selected from at least one of the group consisting of Si, Si alloys and C.

10. The fiber-reinforced material according to claim 1, wherein said at least one metal is selected from the group consisting of the metals, Cr, Mo, Fe, Co, Ni, Pd, Pt, Cu, Ag, Au, Zn, Sn and an alloy of said metals.

11. The fiber-reinforced material according to claim 1, wherein said fibers are carbon or graphite fibers having a surface coated with a coating selected from the group consisting of carbon and graphite.

12. A brake disc, comprising the fiber-reinforced material according to claim 1.

13. The brake disc according to claim 12, wherein said at least one metal is deposited in the immediate vicinity of said fibers.

14. A brake lining, comprising the fiber-reinforced material according to claim 1.

15. The brake lining according to claim 14, wherein said at least one metal is deposited in the immediate vicinity of said fibers.

16. A clutch plate, comprising the fiber-reinforced material according to claim 1.

17. The clutch plate according to claim 16, wherein said at least one metal is deposited in the immediate vicinity of said fibers.

* * * * *